United States Patent Office 3,437,234
Patented Apr. 8, 1969

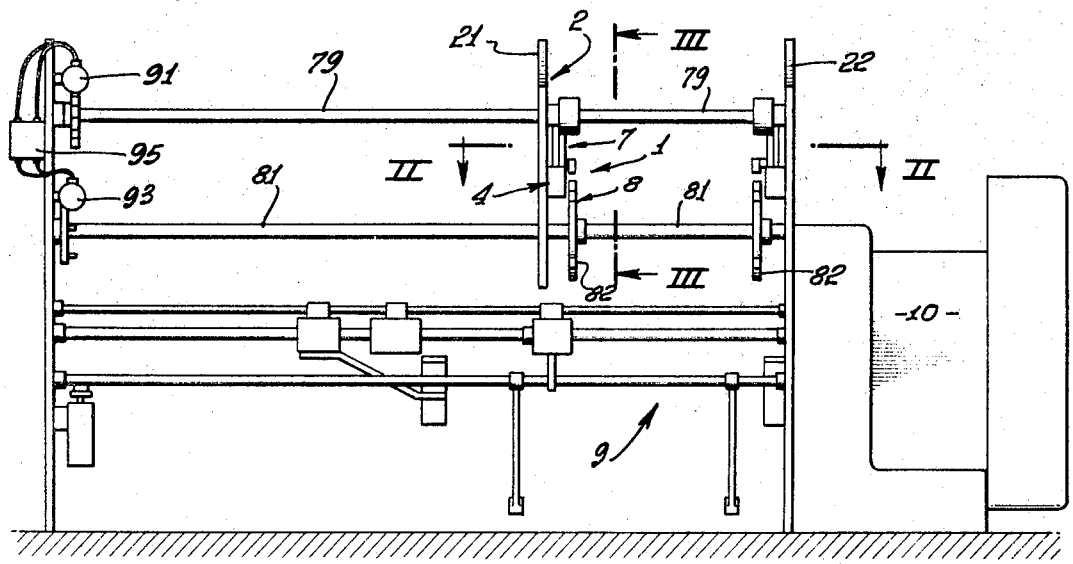
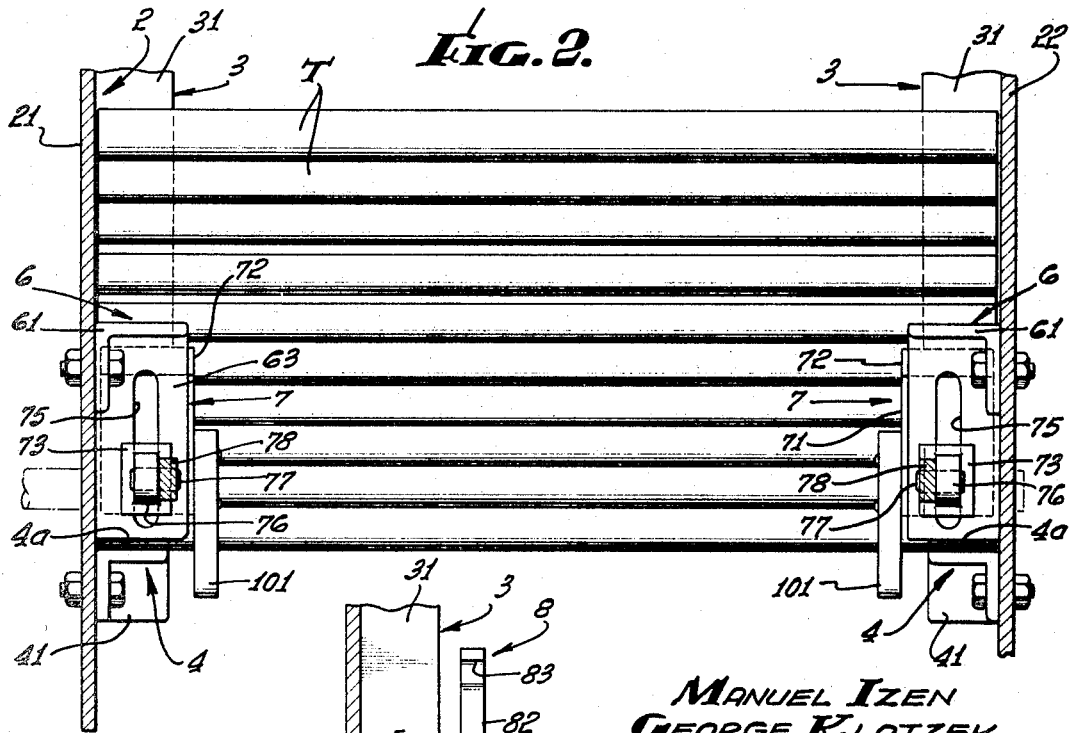
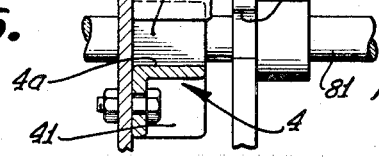

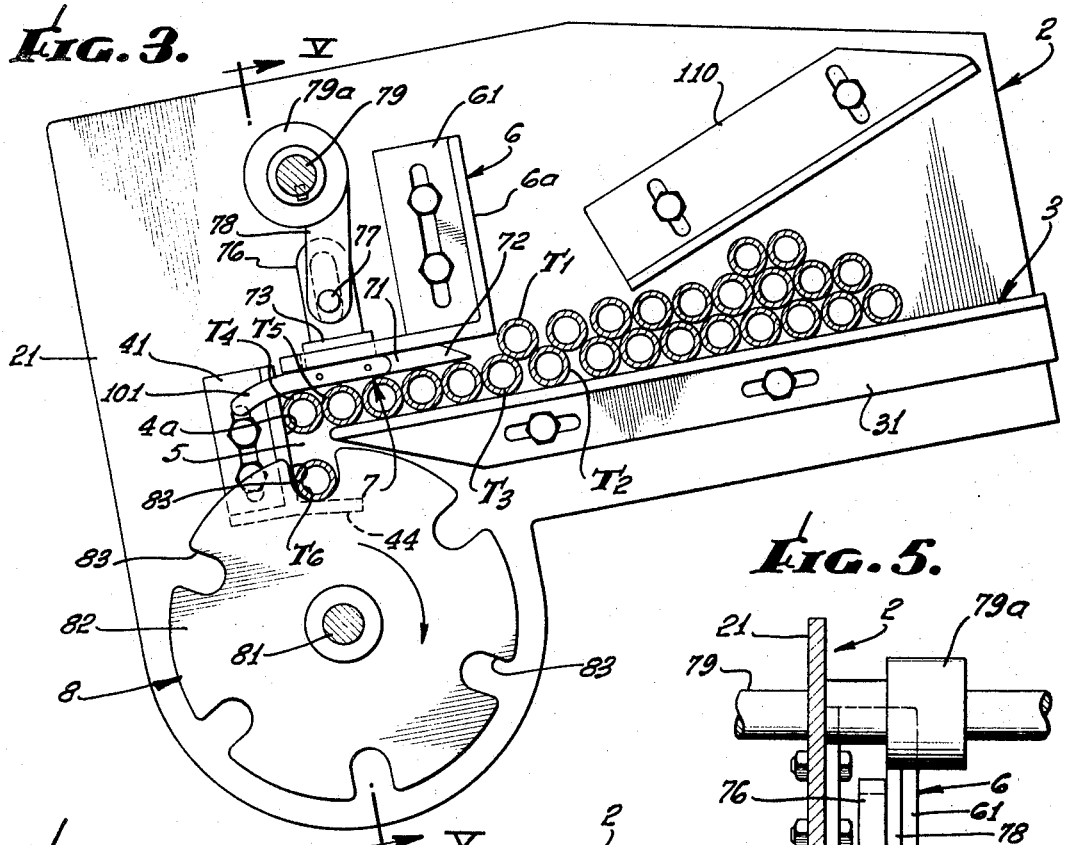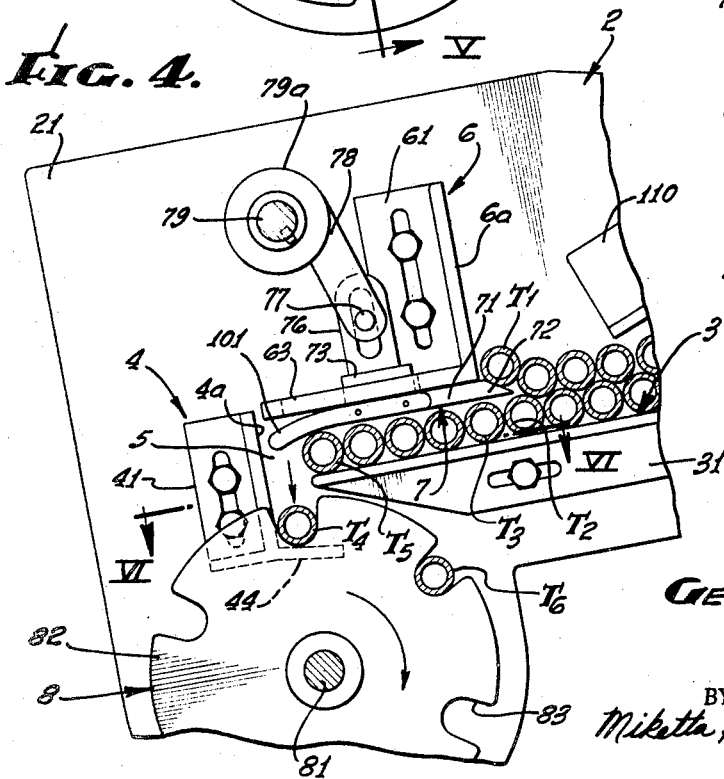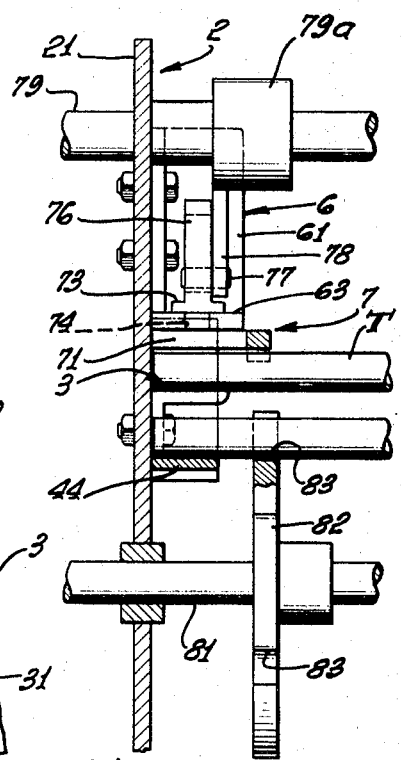

3,437,234
APPARATUS AND A METHOD FOR DISCHARGING INDIVIDUAL WORKPIECES FROM A SUPERIMPOSED SUPPLY THEREOF
Manuel Izen, 1785 E. Vernon Ave., Los Angeles, Calif. 90058, and George Klotzek, Los Angeles, Calif.; said Klotzek assignor to said Izen
Filed July 28, 1967, Ser. No. 656,821
Int. Cl. B65g 1/08, 47/84
U.S. Cl. 221—1        9 Claims

ABSTRACT OF THE DISCLOSURE

Apparatus for positively discharging individual cylindrical workpieces from a supply of superimposed cylindrical workpieces resting upon an inclined surface terminating at a discharge opening, said apparatus including lift and release members reciprocating in a plane above and parallel to the inclined surface whereby stacking, wedging and clogging is eliminated; rear portions of members may include deflecting fingers for positive displacement of workpieces into the discharge opening and onto a transfer mechanism.

---

A method of facilitating positive rolling discharge of cylindrical workpieces from the lowermost level of a superimposed supply wherein the wedging weight and frictional contact of superimposed workpieces is periodically lifted and relieved.

BACKGROUND OF INVENTION

The handling and discharging of cylindrical workpieces or parts either by gravity feed or force feed poses various difficulties. While the ability of the workpieces to roll may be helpful in moving them from place to place, this ability also creates problems of controlling such rolling. In this regard, when a supply of cylindrical pieces arranged in a nonsegregated, superimposed body with their axes parallel, are moved transversely of their axes, they will tend to roll over one another and accumulate in stacks or piles in lower areas or against guides or baffles used to direct or regulate their travel.

Such accumulating is generally undesirable because it tends to cause wedging, jamming and to restrict desired rolling or movement of individual cylindrical workpieces because of the forces applied by surrounding workpieces, particularly those on top, and because of the characteristic of such workpieces to nest or interlock with one another when so stacked.

Thus, for example, hoppers or bins were previously used which held a supply of cylindrical workpieces (tubing, pipe, etc.) which were supported on an inclined bottom wall of the bin for discharge of individual workpieces from the supply through a suitable opening at the lower forward end of the incline. It was found, however, that the workpieces tended to accumulate in a stack at the lower end of the incline against the forward wall of the bin. The weight of the stacked workpieces and the friction and interlock between workpieces acted to restrain the desired downward movement of the lower workpieces which rested directly on the inclined wall. It was also found that stationary baffles or the like designed to restrain forward movement of the upper workpieces while permitting only the lower workpieces to pass downwardly along the inclined wall have not been effective because the stack of workpieces tended to be and remain interlocked. Thus, restraining movement of only the upper portion of the stack tended to restrain forward movement of the other or lower portion of the stack as well.

Another characteristic of cylindrical workpieces is their ability, despite curved outer surfaces, to be supported in balanced or equilibrium condition in a row or straight line by opposed pressure at either end of the row. In this regard, a row of cylindrical workpieces aligned along an inclined surface and stopped by the bin forward wall at the bottom of the incline will tend to be self-supporting in the row by virtue of their own weight and the load on them of other workpieces. Merely placing a discharge opening in the lower end of the incline will not ensure that workpieces moved into position above the opening will fall therethrough; rather, the piece which is positioned above the opening may become jammed against the front wall of the bin and thereby suspended above the opening.

Because of these problems, prior discharging devices for cylindrical workpieces have usually not attempted to use large unsegregated supplies of workpieces, but rather have gone to segregated or arranged supplies as, for example, by the use of magazines accepting only a single row of workpieces. Such magazines and the like have obvious limitations and disadvantages, such as having limited capacities and requiring frequent, time consuming loading.

The present invention contemplates a simple and effective apparatus which solves the problems associated with discharging successive individual cylindrical workpieces from a superimposed supply thereof, while utilizing gravity in facilitating movement of the pieces. In one exemplary form of apparatus, cylindrical workpieces in a superimposed supply thereof supported on an inclined surface are intermittently engaged so as to relieve the load on the lowermost and forwardmost workpieces to permit them to freely roll or move down the inclined surface. The apparatus is also constructed and arranged to limit the height of superimposed accumulated workpieces. The apparatus may also include means for positive discharge of workpieces downwardly through a discharge opening in the plane of the incline.

It is a principal object of the present invention to provide a novel and improved apparatus for discharging individual cylindrical workpieces in positive succession from a superimposed supply thereof without jamming, wedging or clogging. The workpieces may be discharged in timed sequence upon a suitable transfer mechanism.

It is also an object of this invention to provide a novel and improved method of facilitating the discharge of cylindrical workpieces from a superimposed supply thereof.

It is a more specific object of the present invention to provide such an apparatus and a method wherein upper cylindrical workpieces of a superimposed supply thereof supported on an inclined surface are intermittently lifted so as to relieve the pressure on lower and forward workpieces to permit them to roll down the inclined surface.

It is another object of the present invention to effectively control the amount of stacking up of cylindrical workpieces in connection with discharging individual cylindrical workpieces from a superimposed supply thereof.

Other objects and advantages of the invention will become more apparent from the following description and the associated drawings.

In the drawings:

FIG. 1 is a somewhat schematic elevational view of a swaging machine and a machine for feeding cylindrical workpieces to the swaging machine, the feeding machine including apparatus for discharging individual workpieces from a superimposed supply thereof. The discharging apparatus illustrates a presently preferred form of the invention and is operable in accordance with the method of the invention.

FIG. 2 is an enlarged horizontal section taken generally along plane II—II of FIG. 1, showing the discharging apparatus in detail and showing a supply of cylindrical workpieces loaded on the discharging apparatus.

FIG. 3 is a enlarged vertical section taken generally along the plane III—III of FIG. 1, showing the discharging apparatus in withdrawn or resetting position and showing a superimposed supply of cylindrical workpieces loaded on the apparatus.

FIG. 4 is a vertical section generally like FIG. 3, but showing the discharging apparatus in delivery or discharging position;

FIG. 5 is a vertical section taken generally along plane V—V of FIG. 3.

FIG. 6 is a horizontal section taken generally along plane VI—VI of FIG. 4, but with the workpieces not shown.

In general, the illustrated exemplary discharging apparatus 1 includes bin means 2 having an inclined support surface 3 on which a superimposed supply of cylindrical workpieces rest for gravity rolling therealong. A stop wall 4 is provided in spaced relation to the lower end of the inclined surface 3 to cooperate therewith to form a laterally extending downwardly directed discharge opening 5 for an individual workpiece. Limiting and aligning means 6 are positioned above and upstream of the discharge opening 5 for contact with superimposed workpieces to limit and align them into parallel relation with the discharge opening. A lifting and feeding means 7 is mounted for reciprocating movement in a plane parallel to and above the inclined surface 3 into periodic lifting engagement with superimposed workpieces to release lower workpieces for rolling toward the discharge opening 5. The individual workpiece discharged through the opening 5 is received by a transfer mechanism 8, which may be driven in timed relation with the reciprocation of the lifting and feeding means 7.

The discharging apparatus may be used with or comprise part of various machines or systems for handling and/or performing work on cylindrical workpieces. FIGURE 1 illustrates transfer mechanism 8 and a feeding machine 9 for sequentially feeding individual cylindrical workpieces to an adjacently positioned swaging machine 10. The exemplary apparatus 1 discharges the cylindrical workpieces one at a time onto the transfer mechanism 8 which will be described in detail below.

The exemplary discharging apparatus 1 is illustrated and described in connection with elongated tubular workpieces T, although the workpieces may be solid bars or cylinders. Further, the workpieces may be of almost any desired material, although they should have sufficient strength and rigidity to withstand engagement with the discharging aparatus and so that they will not be deformed by their own weight when they are stacked or superimposed.

The bin or hopper means of the discharging apparatus is adapted to receive a superimposed or stacked supply of the workpieces on the inclined support surface or means. In the form shown in the drawings, the bin means 2 is comprised by a spaced pair of transversely extending vertical side plates 21 and 22, each carrying an inwardly directed inclined surface 3.

The inclined supporting surfaces 3 may constitute inwardly extending flanges of angle irons 31 carried in parallel relation on facing sides of plates 21 and 22 for supporting opposite ends of the workpieces.

The workpieces extend generally normal to the side plates 21, 22 with the spacing between side plates being slightly greater than the length of the workpieces. To accommodate workpieces of different lengths, one plate 21 may be adjustably mounted by suitable means (such as shafts 79 and 81) to permit it to be positioned closer to or further from the other plate 22.

A stop means 4 which limits motion of workpieces downwardly along the inclined support surface is provided with a stop face 4a in spaced relation with respect to the lower end of the support surface, and cooperates therewith to provide the laterally extending downwardly directed discharge opening 5 for an individual workpiece. In the exemplary apparatus 1, the stop means 4 may comprise a pair of brackets 41, each secured to one of the side plates 21, 22. Each bracket 41 includes an inwardly extending generally upright portion which provides the stop surface 4a. The stop surfaces 4a are spaced from the lower ends of the inclined members 31 by slightly more than the diameter of one workpiece to permit passage of one end of the workpiece downwardly through the discharge opening 5 formed between the stop surfaces and the inclined members. Each bracket 41 may include a horizontal support or guide portion 44 disposed below the discharge opening 5 for receiving and guiding a workpiece which has been discharged downwardly through the opening onto a transfer mechanism.

Means are positioned above the lower portion of the inclined surface and in advance of the discharge opening for contact with superimposed cylindrical workpieces to limit and align the latter into parallel position with the discharge opening. These means may take the form of a pair of brackets 61, one mounted to each side plate 21, 22 above the lower portion of an inclined member 31. Each aligning bracket 61 has an inwardly extending generally horizontal portion 63, having a lower surface spaced above and parallel to an inclined support surface 3. This space may be about one-and-a-half workpiece diameters in the illustrated apparatus. In any event, it is desirable that the spacing prevent more than a single height or row of workpieces to pass between portion 63 and the inclined support members 31; as shown in FIGURES 3 and 4, brackets 61 are vertically adjustable for workpieces of different diameters.

The upstream edge of portion 63 is provided with a generally upright inwardly extending limiting portion 6 having a forwardly directed face 6a that is generally normal to the plane of the inclined support surfaces 3. These upright surfaces 6a, and particularly their confluence with 63, provide a limiting zone to limit downward movement of workpieces except for the single row of workpieces which rolls between the lower portions 63 and the inclined members 31.

With only the structure described above, the supply of superimposed workpieces may tend to jam, wedge or clog rather than roll in uninterrupted succession down the inclined surface and through the discharge opening. For example, as shown in FIGURE 3, tubular workpieces T-1 and T-2 may become wedged between an aligning bracket 61 and inclined surface 3. The pressure of upstream and superimposed workpieces will tend to maintain T-1 and T-2 in such wedged position even when a downstream workpiece such as T-3 subsequently rolls downwardly.

To deal with this situation, a lifting and feeding means is mounted for movement in a plane parallel to and above the lower portion of the inclined support means and spaced therefrom a distance slightly greater than the diameter of a cylindrical workpiece. Means are also provided for reciprocating the lifting and feeding means in said plane into periodic lifting engagement with superimposed workpieces to release lower workpieces for rolling toward the discharge opening.

In the exemplary embodiment illustrated in the drawings, the lifting and feeding means 7 includes a pair of generally rectangular lifting blades or members 71, each having an inclined forward edge portion 72. Each lifting blade 71 is movably supported from one of the aligning brackets 61. This may be achieved by a support block or plate 73 disposed above the bracket lower portion 63 and connected to the lifting blade 71 by a pin portion 74 (FIG. 5) which extends through a slot 75 in the bracket portion 63. The slots 75 (FIG. 2) extend generally parallel to the side plates 21, 22, to permit the forward and backward reciprocating movement of the lifting blades 71 to position the forward edge portions 72 between a position downstream from the aligning means as shown in FIGURE 3 and a position in lifting engagement with superimposed workpieces upstream of the aligning means as shown in FIGURE 4. As shown in FIGURE 4, the inclined edge portions 72 are adapted to engage and lift or raise superimposed workpieces such as T–1 to release at least one lower workpiece such as T–2 for rolling movement toward the discharge opening 5. While the drawings show only a single workpiece T–1 adjacent to the aligning upright surfaces 6a, a number of workpieces may become stacked against those surfaces and they will all be raised or lifted by the action of the lifting blades 71.

The inclined forward edge portion 72 is desirably constructed of a rigid, durable and strong material such as steel to effectively accomplish its lifting function and to withstand the repeated engaging contact with the workpieces. An edge portion of semiflexible material such as hard rubber or plastic might be used for certain applications as for very lightweight workpieces such as tubular cardboard pieces. The illustrated lifting blades 71 are configured to have substantial body and strength while the inclined forward edge portions 72 provide knife edges followed by upwardly camming inclined surfaces to facilitate their insertion between superimposed and lower workpieces and effective raising of the superimposed workpiece or workpieces. While the tubular workpieces T are engaged adjacent either end in the illustrated form of the apparatus, it will be apparent that the lifting means may be positioned at other selected locations as for example at positions centrally of the workpieces.

The means for reciprocating the lifting and feeding means may take various suitable forms. In the illustrated apparatus 1, each supporting block 73 has an upward extension 76 with a generally vertical slot therethrough. Each slot slidably receives a pin 77 carried by the outer end of arm 78 fixed to an angularly reciprocating (oscillating) shaft 79 as by means of a collar 79a. Oscillation of the shaft 79 is thereby converted to linear reciprocation of the lifting blades 71. The reciprocation of the shaft 79 may be controlled by hydraulic cylinder and rack-and-pinion means indicated generally at 91 in FIGURE 1, or by other drive means.

As shown in FIG. 3, a workpiece T–4 may occasionally become wedged between the stop surfaces 4a and the workpiece T–5 immediately upstream so that workpiece T–4 is prevented from dropping downwardly through the discharge opening 5. Means may also be provided for positive displacement of such jammed or wedged workpiece through the discharge opening. In the form of apparatus shown in drawings, a deflecting finger 101 is mounted on each lifting blade 71, each finger 101 extending generally rearwardly from the blade and toward the plane of the inclined support surfaces 3 to within a distance from that plane less than the diameter of the workpiece. Thus, should a workpiece such as T–4 become wedged in the position shown in FIGURE 3, forward movement of the deflecting fingers 101 to the position shown in FIGURE 4 will positively displace workpiece T–4 downwardly through the discharge opening 5.

As the individual workpieces are discharged through the opening, they may be individually received by any suitable means and moved in spaced relation to one another. The transfer means 8 illustrated in the drawings is a rotary carriage arrangement comprised of a transverse shaft 81 on which are fixedly mounted a spaced pair of workpiece-receiving discs or wheels 82. As shown best in FIGURES 3 and 4, the wheels 82 are provided at regularly spaced intervals around their circumference with slots or notches 83 proportioned to receive an individual workpiece. Each wheel may be comprised of a pair of complementary discs (not shown) to accommodate different diameter workpieces. The exemplary transfer means 8 is positioned generally below the discharge opening 5, with the axis of the shaft 81 aligned with that opening 5 so that successive workpiece-receiving notches 83 may be brought into alignment with the discharge opening by rotation of the shaft 81.

Suitable means may be provided for driving the transfer means. In the illustrated apparatus, the shaft 81 is intermittently rotated as through a conventional ratchet arrangement (not shown) which is driven by a reciprocating hydraulic cylinder means designated generally as 93 in FIGURE 1. Drive 93 and drive 91 are preferably actuated in timed relation by a control 95 whereby the transfer means receives a workpiece whenever the release means discharges a workpiece.

It will be noted that the workpiece-receiving notches 83 and the upper surfaces of the stop bracket lower portions 44 may cooperate to receive and support a workpiece when it first passes through the discharge opening 5 and is received by the transfer means. Subsequent rotation of the wheels 82 in the direction indicated by the arrows in FIGURES 3 and 4 removes the workpiece T–6 from the bracket portions 44, carrying the workpiece around as the wheels rotate until a desired discharge position is reached. The transfer means 8 may include suitable cover means disposed around the periphery of the wheels to retain the workpiece in place and suitable discharge or chute means for receiving the workpiece (neither of which are shown).

Referring to FIGURE 1, as the workpieces are individually delivered by the transfer means 8, they may be supported and grasped by a feeding machine 9 and moved into the swaging machine 10 or have other work performed upon them. A form of feeding machine is shown in U.S. Patent No. 3,360,164.

Thus, referring to the drawings, FIGURE 3 shows the lifting means drive shaft 79 rotated clockwise by the cylinder means 91 to position the lifting blades 71 and deflecting fingers 101 in their rearward or withdrawn positions; at generally the same point in time, the cylinder means 93 for the transfer means 8 is operated through its ratchet or lost-motion movement so that the transfer shaft 81 and wheels 82 are stationary with a set of workpiece-receiving notches 83 positioned below the discharge opening 5. The drive means 91 and 93 are then operated: to rotate the lifting means shaft 79 counterclockwise to move the lifting blades 71 and deflecting fingers 101 forwardly to the positions shown in FIGURE 4; transfer shaft 81 is then rotated clockwise to advance the workpiece T–6 and to position an empty pair of notches 83 below the discharge opening for receiving another workpiece T–4. The workpiece T–4 is positively displaced through the discharge opening 5 by the fingers 101. The forward edge portions 72 engage and lift the superimposed workpiece T–1 to permit the lower workpiece T–2 to roll downward. The apparatus may continue to cyclically operate in this manner at any selected suitable intervals.

To reduce the buildup or stacking of workpieces, particularly in the lifting zone adjacent the limiting surfaces 6a, suitable retaining means may be provided. In the illustrated apparatus, as shown best in FIGURE 3, an elongated member 110 is secured to each side plate 21, 22 so as to extend into the path of the workpieces traveling down the inclined support surfaces 3. The distance between the lower ends of the members 110 and the plane of the inclined support surfaces 3 is desirably selected to prevent more than two superimposed rows of workpieces from passing through the space. This tends to reduce accumulation and stacking of workpieces against the aligning and limiting brackets 61.

In the exemplary apparatus, the retaining members 110 are positioned upstream of the aligning brackets 61 with their rear ends spaced a predetermined distance above the inclined support surfaces 3, and extending upwardly and forwardly therefrom at a forwardly diverging angle of preferably less than 45° from the plane of the inclined support surfaces 3. By making this angle less than 45°, the natural tendency of the cylindrical workpieces to nest and pyramid is limited.

As is noted above, different lengths of workpieces may be accommodated by moving one or both of the side plates 21, 22 and the parts which they support toward or away from one another. The apparatus may be readily adjusted to accommodate cylindrical workpieces of different diameters as well. Thus, as shown in FIGURES 3 and 4, the aligning brackets 61, the retaining members 110, the inclined support members 31, and the stop brackets 41 are provided with slots through which the bolts securing them to the side plates 21, 22 extend, to permit adjustment of their positions to accommodate different diameter workpieces.

The illustrated discharge apparatus thus effectively solves the problems of discharging individual cylindrical workpieces from a superimposed supply thereof without wedging, jamming or clogging. Periodically lifting superimposed workpieces requires supplying only small forces and insures that the discharge of workpieces will be continuous and positive with no gaps or delays. The need for supervising the operation of the discharge apparatus is virtually eliminated, and the length of time for which the apparatus can run without being attended depends merely on the capacity of the workpiece holding or bin means. The illustrated structure is economical and durable, and relatively simple to construct and maintain. It provides a novel arrangement and combination of parts which cooperate with one another to provide effective dependable discharge of individual workpieces from a superimposed supply which has heretofore not been commercially possible or practical.

We claim:

1. A method of facilitating rolling discharge of cylindrical workpieces from a superimposed supply thereof, comprising:

forming a superimposed supply of parallel cylindrical workpieces on an inclined surface leading to a downwardly directed discharge opening;

limiting rolling movement toward such opening, at a limiting zone, of superimposed and all but a limited number of lowermost workpieces;

and cyclically lifting superimposed workpieces vertically at such limiting zone to relieve the pressure of said superimposed pieces upon a lowermost piece and thus to permit rolling movement of said lowermost workpiece toward a discharge opening.

2. An apparatus for positively discharging individual cylindrical workpieces from a superimposed supply thereof on an inclined supporting surface, comprising:

inclined means adapted to support a supply of cylindrical workpieces for gravity rolling therealong;

stop means in spaced relation with respect to the lower end of said inclined support means and cooperating therewith to provide a laterally extending, downwardly directed discharge opening for an individual workpiece;

means positioned above the lower portion of said inclined means and in advance of said discharge opening for contact with superimposed cylindrical workpieces to limit and align the latter into parallel relation with the discharge opening;

a lifting and feeding means including an inclined forward edge portion mounted for movement in a plane parallel to and above the lower portion of said inclined support means and spaced therefrom a distance slightly greater than the diameter of a cylindrical workpiece;

means for driving said lifting and feeding means to reciprocate said forward edge portion into periodic lifting engagement with superimposed workpieces to release lower workpieces for rolling toward said discharge opening, said reciprocating means moving said forward edge portion between a position downstream from the aligning means to a position in lifting engagement upstream of said aligning means;

deflecting means carried by said lifting and feeding means for periodically, positively displacing successive workpieces toward said discharge opening;

transfer means adapted to receive individual workpieces discharged from said discharge opening and move the same in spaced relation; and means for driving said transfer means in timed relation with the reciprocation of said forward edge portion of the lifting and feeding means.

3. Apparatus as stated in claim 2, including retaining means positioned in advance of said aligning means and spaced above said inclined support means to limit the stacking of workpieces against said limiting and aligning means, said retaining means comprising an elongated inclined member forming a forwardly diverging angle with the inclined support means of less than 45° to limit natural stacking of the workpieces.

4. An apparatus for positively discharging individual cylindrical workpieces from a superimposed supply thereof on an inclined supporting surface, comprising:

inclined means adapted to support a supply of cylindrical workpieces for gravity rolling therealong;

stop means in spaced relation with respect to the lower end of said inclined support means and cooperating therewith to provide a laterally extending, downwardly directed discharge opening for an individual workpiece;

means positioned above the lower portion of said inclined means in advance of said discharge opening for contact with superimposed cylindrical workpieces to limit and align the latter into parallel relation with the discharge opening;

a lifting and feeding means mounted for movement in a plane parallel to and above the lower portion of said inclined support means and spaced therefrom a distance slightly greater than the diameter of a cylindrical workpiece;

and means for reciprocating said lifting and feeding means in said plane into periodic lifting engagement with superimposed workpieces to release lower workpieces for rolling toward said discharge opening.

5. Apparatus as stated in claim 4, wherein said lifting and feeding means includes an inclined forward edge portion and said reciprocating means moves said forward edge portion between a position downstream from the aligning means to a position in lifting engagement upstream of said aligning means.

6. Apparatus as stated in claim 4, including deflecting means carried by said lifting and feeding means for periodically, positively displacing successive workpieces toward said discharge opening.

7. Apparatus as stated in claim 4, including transfer means adapted to receive individual workpieces discharged from said discharge opening and move the same in spaced relation, and means for driving said transfer means in timed relation to the reciprocation of said lifting and feeding means.

8. Apparatus as stated in claim 4 including retaining means positioned in advance of said limiting and aligning means and spaced above said inclined means to define a passageway therebetween for limiting the height of workpieces moving downwardly along the inclined means through said passageway to two superimposed rows, to limit the accumulation of workpieces in the region of the aligning means.

9. In an apparatus for positively discharging individual cylindrical workpieces from a superimposed supply thereof on an inclined supporting surface, which apparatus includes inclined means adapted to support a supply of cylindrical workpieces for gravity rolling therealong, and stop means in spaced relation with respect to the lower end of the inclined support means and cooperating therewith to provide a laterally extending, downwardly directed discharge opening for an individual workpiece, the provision of:

means positioned above the lower portion of the inclined means and in advance of the discharge opening for contact with superimposed cylindrical workpieces to limit and align the latter into parallel relation with the discharge opening;

a lifting and feeding means mounted for movement in a plane parallel to and above the lower portion of the inclined support means and spaced therefrom a distance slightly greater than the diameter of a cylindrical workpiece;

and means for reciprocating said lifting and feeding means in said plane into periodic lifting engagement with superimposed workpieces to release lower workpieces for rolling toward the discharge opening.

References Cited

UNITED STATES PATENTS

| | | | |
|---|---|---|---|
| 396,297 | 1/1889 | Schofield | 221—242 |
| 513,472 | 1/1890 | Alexander | 221—200 |
| 992,282 | 5/1911 | Speyer | 221—200 |
| 2,586,424 | 2/1952 | Gazette | 221—266 X |
| 3,206,065 | 9/1965 | Netta | 221—201 |
| 3,305,128 | 2/1967 | Dearsley | 221—201 |
| 3,360,164 | 12/1967 | Zerlaut | 221—239 |

FOREIGN PATENTS 111,830  8/1964  Czechoslovakia.

WALTER SOBIN, *Primary Examiner.*

U.S. Cl. X.R.

221—200, 242, 266, 277